United States Patent [19]
Ensley et al.

[11] Patent Number: 6,117,462
[45] Date of Patent: Sep. 12, 2000

[54] NUTRITIONAL SUPPLEMENTS

[75] Inventors: Burt D. Ensley, Newtown, Pa.; Mark Elless, Mt. Laurel, N.J.; Michael J. Blaylock, Dayton, N.J.; Jianwei Huang, Plainsboro, N.J.

[73] Assignees: NuCycle Therapy, Inc., Monmouth Junction; Rutgers University, New Brunswick, both of N.J.

[21] Appl. No.: 09/041,355

[22] Filed: Mar. 12, 1998

[51] Int. Cl.[7] .............................. A23K 1/175; A23L 1/30
[52] U.S. Cl. ........................... 426/74; 426/615; 426/809; 426/648
[58] Field of Search ............................. 426/74, 648, 615, 426/809

[56] References Cited

U.S. PATENT DOCUMENTS

| | | | |
|---|---|---|---|
| 5,364,451 | 11/1994 | Raskin et al. | 75/710 |
| 5,393,426 | 2/1995 | Raskin et al. | 210/602 |
| 5,686,108 | 11/1997 | Pusateri et al. | 424/464 |
| 5,728,300 | 3/1998 | Kapulnik et al. | 210/602 |
| 5,785,735 | 7/1998 | Raskin et al. | 75/711 |

OTHER PUBLICATIONS

Beilstein, et al., "Deposition of Dietary Organic and Inorganic Selenium in Rat Erythrocyte Proteins," *J. Nutr.* 116:1701–1710 (1986).

Cai, et al., "Allium Chemistry: Identification of Selenoamino Acids in Ordinary and Selenium–Enriched Garlic, Onion, and Broccoli Using Gas Chromatography with Atomic Emission Detection," *J. Agric. Food Chem.* 1995(43): 1754–1757 (1995).

Cappon, "Mercury and Selenium Content and Chemical Form in Vegetable Crops Grown on Sludge–Amended Soil," *Arch. Environm. Contam. Toxicol.* 10:673–689 (1981).

Clark, et al., "Selenium Poisoning from a Nutritional Supplement," *JAMA* 275(10):1087–1088 (Apr. 10, 1996).

Ge, et al., "Identification of Selenium Species in Selenium–enriched Garlic, Onion and Broccoli Using High–Performance Ion Chromatography With Inductively Coupled Plasma Mass Sprectrometry Detection," *Analyt. Comm.* 33:279–281 (Aug., 1996).

Ip, et al., "Mammary Cancer Prevention by Regular Garlic and Selenium–Enriched Garlic," *Nutrition and Cancer* 17(3):279–286 (1992).

Ip, et al., "Bioavailability of Selenium From Selenium–Enriched Garlic," *Nutrition and Cancer* 20(2):129–137 (1993).

Ip, et al., "Potential of Food Modification in Cancer Prevention," *Cancer Research (Supp)* 54:1957s–1959s (Apr. 1, 1994).

Ip, et al., "Characterization of tissue selenium profiles and anticarcinogenic responses in rats fed natural sources of selenium–rich products," *Carcinogenesis* 15(4):573–576 (1994).

Ip, et al., "Enrichment of selenium in allium vegetables for cancer prevention," *Carcinogenesis* 15(9):1881–1885 (1994).

Ip, et al., "Efficacy of cancer prevention by high–selenium garlic is primarily dependent on the action of selenium," *Carcinogenesis* 16(11):2549–2652 (1995).

Lu, et al., "Effect of an aqueous extract of selenium–enriched garlic on in vitro markers and in vivo efficacy in cancer prevention," *Carcinogenesis* 17(9):1903–1907 (1996).

Marks, et al., "S–Methycysteine Sulfoxide in Brassica Vegetables and Formation of Methyl Methanethiosulfinate from Brussel Sprouts," *J. Agric. Food Chem.* 40(11):2098–2101 (1992).

Marks, et al., "Effect of S–Methyl Cysteine Sulphoxide and its Metabolite Methyl Methane Thiosuphinate, Both Occurring Naturally in Brassica Vegetables, on Mouse Genotoxicity," *Fd Chem Toxic.* 31(7):491–495 (1993).

Olson, et al., "Investigations on Selenium in Wheat," *Phytochemistry* 9:1181–1188 (1970).

Salt, et al., "Metal Accumulation by Agquacultured Seedlings of Indian Mustard," *Env. Sci. & Tech.* 31(6):1636–1644 (1997).

Stoewsand, et al., "Effect of dietary brussels sprouts with increased selenium content of mammary carcinogenesis in the rat," *Cancer Letters* 45:43–48 (1989).

Ip, et al., "Selenium–enriched garlic inhibits the early stage but not the late stage of mammary carcinogenesis," *Carcinogenesis* 17(9):1979–1982 (1996).

*Primary Examiner*—Chhaya D. Sayala
*Attorney, Agent, or Firm*—Choate, Hall & Stewart

[57] ABSTRACT

A method of producing metal-rich plants for the production of nutritional supplements. Edible plants are placed in a growth environment containing metal, and are cultivated in a fashion which enhances the uptake of metal into edible portions of the plants. The plants are then harvested, and may be eaten directly or processed into capsule or tablet form, in order to obtain the metallic nutrients so incorporated.

21 Claims, 3 Drawing Sheets

NUTRITIONAL SUPPLEMENTS

FIELD OF THE INVENTION

This invention relates to the use of plants which have been induced to accumulate metals for the production of nutritional supplements.

BACKGROUND OF THE INVENTION

The human body requires at least small amounts of a number of metals in order to maintain health. The diets of many people do not provide sufficient quantities of these metals, and these people benefit from the addition of nutritional supplements to their diets. However, it can be difficult to produce supplements that provide metals in a metabolically available form.

Even for metals which are relatively easy to provide in a metabolically available form, some consumers have an aversion to ingesting chemicals or foods that are perceived as having been artificially processed. Such consumers tend to prefer to eat plant foods which are naturally high in the requisite metals. However, metal-rich edible plants can be difficult to obtain, and metal concentrations tend to be low, so that a large quantity must be eaten in order to obtain sufficient quantities of the metals. These drawbacks become prohibitive when the large number of metals which are beneficial to human health is considered.

An ideal dietary supplement would be an edible plant which contained high concentrations of several beneficial metals, in concentration ratios similar to the ratios considered most beneficial to humans, and contained negligible quantities of toxins. This plant would ideally be easily harvestable in a form which could be eaten fresh or dried, or could be used to form metal-rich tablets or capsules which could be taken as nutritional supplements. Unfortunately, no such naturally-occurring plant is known.

Some attempts have been made to increase the level of selenium present in garlic (Ip, et al., "Potential of Food Modification in Cancer Prevention," *Cancer Research* (Suppl.) 54:1957s–1959s, April, 1994) and in brussels sprouts (Stoewsand, et al., "Effect of dietary brussels sprouts with increased selenium content on mammary carcinogenesis in the rat," *Cancer Letters* 45:43– 48, 1989), but achievable concentrations were found to be quite small. These two studies, which tested the effect of selenium on mammary carcinogenesis in rats, used dietary fractions of 2% for garlic and 20% for brussels sprouts in order to achieve sufficient selenium levels. These would represent prohibitively large quantities of a single food in a normal human diet.

SUMMARY OF THE INVENTION

The present invention pertains to a method of producing plant foods and nutritional supplements which are rich in metals. In one aspect, the invention comprises manipulating the environment and growth of an edible crop plant to cause it to accumulate nutritionally significant amounts of metal in its edible portions, and then harvesting the metal-rich edible portions. These metal-rich portions may be themselves used as food or may be subject to further processing for incorporation into nutritional supplements. The growth environment may already contain appropriate amounts of desired metals, or these may be added before or during the cultivation process. Exemplary metals contemplated for use with the invention are iron, zinc, manganese, chromium, selenium, vanadium, molybdenum, boron, titanium, and germanium. The first five of these are considered particularly advantageous, but any nutritionally valuable metal which can be caused to accumulate in the edible portions of a plant is suitable for the practice of the invention.

It may be desirable to manipulate the growing environment of the plant during cultivation to enhance uptake of metals. Some methods of enhancing metal uptake in plants are described in U.S. Pat. Nos. 5,785,735 and 5,917,117, which are incorporated herein by reference. Included in some embodiments of the present invention is the step of exposing the plant to an inducing agent which induces hyperaccumulation of metals. In preferred embodiments, the inducing agent is an organic acid, such as citric acid, acetic acid, malic acid, salicylic acid, or succinic acid.

Many plants are suitable for use with the invention. Crop plants which produce a significant biomass are preferred, since such plants are frequently able to incorporate larger quantities of metals in their edible portions, but any plant which can accumulate sufficiently high levels of metals in edible portions may be used in the practice of the invention. In particular, some preferred embodiments use crop plants of the family Brassicaceae. Within this family, plants of genera Brassica, Thlaspi, Alyssum, and Eruca are preferred. Further preferred are species *Brassica juncea, Brassica nigra, Brassica campestris, Brassica carinata, Brassica napus*, and *Brassica oleracea*.

In a related aspect, the invention comprises an isolated, edible plant which has been exposed to an inducing agent, and thereby induced to accumulate more metal in its edible portions than it would in the absence of the inducing agent. Preferred inducing agents are organic acids, such as citric acid, malic acid, acetic acid, salicylic acid, or succinic acid. Metal may be added to the growing environment of the plant. For example, one or more of iron, zinc, manganese, chromium, selenium, vanadium, molybdenum, boron, titanium, and germanium may be added.

In another aspect, the invention comprises a nutritional supplement comprising the edible portions of a plant which has been induced to hyperaccumulate metals. This induction may have been accomplished by exposing the plant to an inducing agent, such as the organic acids citric acid, malic acid, acetic acid, salicylic acid, or succinic acid. Ideally, the plant will accumulate one or more nutritionally valuable metals in amounts of at least 400 ppm metal (dry weight). In one embodiment, the plant is a member of the family Brassicaceae, such as species *Brassica juncea, Brassica oleracea*, and *Brassica carinata*.

In yet another aspect, the invention comprises an isolated, edible plant which contains high levels of nutritionally valuable metals: at least 400 ppm total metal (dry weight). In a preferred embodiment, the plant is a member of the family Brassicaceae, such as species *Brassica juncea, Brassica oleracea*, and *Brassica carinata*.

In still another aspect, the invention comprises a method for producing nutritional supplements. The method comprises the steps of identifying a growth environment containing one or more metals, placing an edible crop plant in contact with that environment, cultivating the plant in a way that allows it to accumulate metal from the environment, harvesting the edible portions of the plant, and incorporating the harvested portions into a nutritional supplement. The growth environment may contain these metals before introduction of the plant, or they may be added before or during the cultivation process. Exemplary metals are iron, zinc, manganese, chromium, selenium, vanadium, molybdenum, boron, titanium, and germanium, with the first five of these being preferred. The cultivation process may include exposing the plant to an inducing agent in order to induce it to accumulate metals; for example, the inducing agent may be an organic acid such as citric acid, acetic acid, malic acid, salicylic acid, or succinic acid. The plant is preferably a member of the family Brassicaceae, such as species *Brassica juncea, Brassica oleracea*, and *Brassica carinata*.

An "isolated plant," as that term is used herein, refers to a plant which has been cultivated by human agency, as distinct from one which has germinated and grown in the wild without human intervention. After a plant has been removed from its growth environment, it is described as having been "harvested."

Unless otherwise indicated, concentrations of metals in plants are dry weight concentrations. The unit of concentration "ppm" indicates parts per million.

The term "metal," as it is used herein, includes elemental metals, metal ions, and compounds containing metal atoms.

The term "soil," as it is used herein, refers to any environment that can serve as a growth environment for plants. In particular, it includes both conventional soil and hydroponic growth environments.

"Nutritionally valuable" metals, as that term is used herein, are metals which are believed to be desirable for human consumption in some quantity. The fact that a metal is toxic at some dosage level does not preclude that metal from being healthful and/or desirable at a different dosage level, and therefore, such metals may still be considered nutritionally valuable. It is also recognized that considerable variation may exist in the amount of a metal which is healthful to different individuals; for example, the USDA recommended dietary allowances (RDA) of iron, zinc and selenium are substantially higher for women who are pregnant or lactating. A "nutritionally significant" quantity of a metal is an amount large enough to affect the health of at least some individuals, or at least 10% of the USDA RDA or other recommended therapeutic dose for the metal.

BRIEF DESCRIPTION OF THE DRAWING

The invention is described with reference to the several figures of the drawing, in which.

DETAILED DESCRIPTION OF CERTAIN PREFERRED EMBODIMENTS

Figure 1:
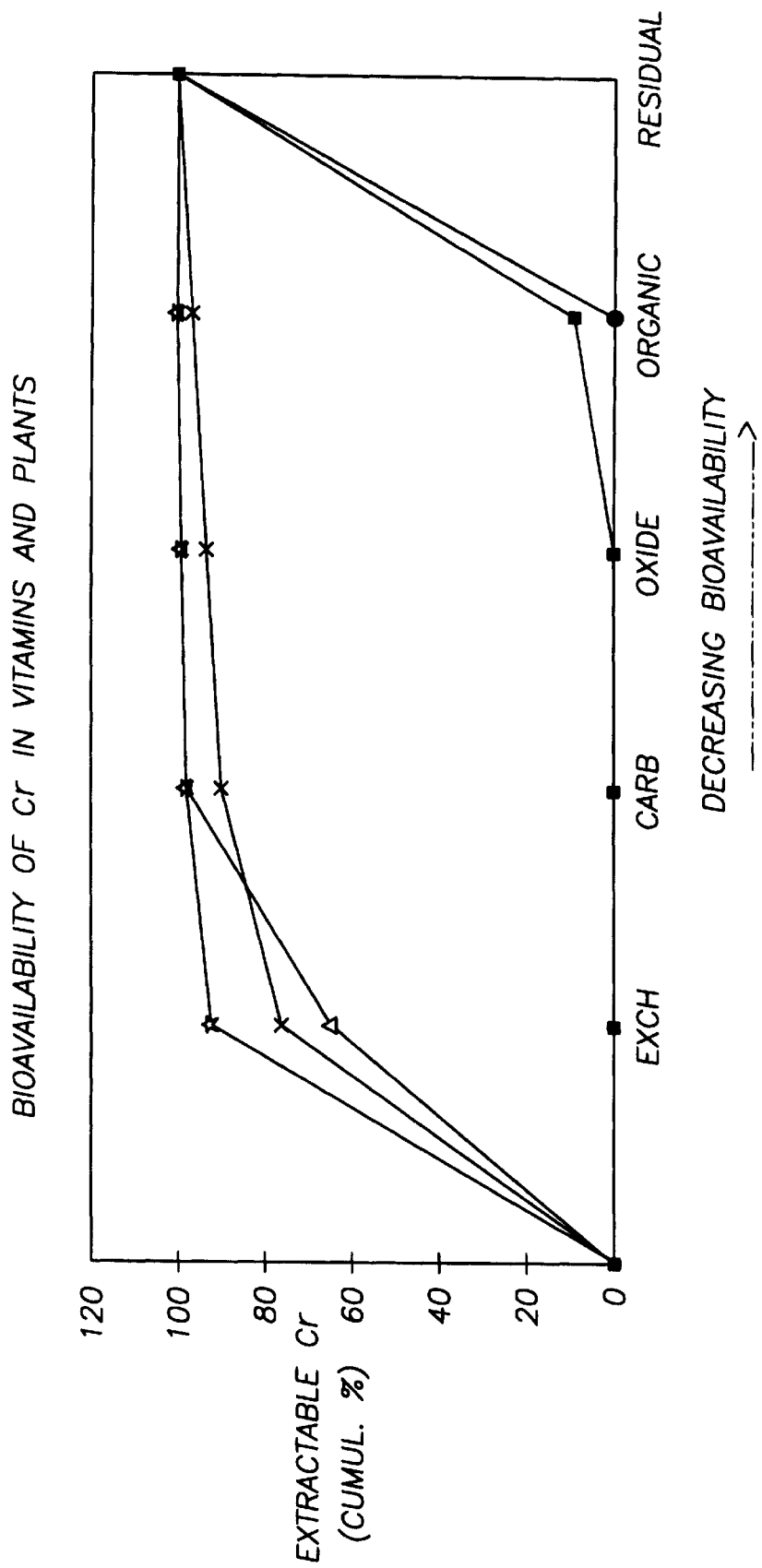
FIG. 1 depicts the bioavailability of chromium in plants according to the invention and in commercially available nutritional supplements.

Those of ordinary skill in the art will appreciate that a variety of methods are available for accumulating metals into plants. Certain edible plants will naturally accumulate metals in their edible portions when grown in environments containing sufficient levels of the metals. However, such environments can be uncommon, and in particular, it is difficult or impossible to find a naturally-occurring environment which will cause plants to take up several metals in healthful proportions for human consumption, even when uptake is stimulated by human intervention. Particularly preferred approaches to stimulating metal uptake are described, for example, in U.S. Pat. Nos. 5,809,693 (which describes methods of promoting metal uptake by contacting plants with certain microorganisms), U.S. Pat. No. 5,785,735 (allowed) (which describes various methods of manipulating the soil environment) and U.S. Pat. No. 5,917,117 (which describes certain inducing agents useful for stimulating high levels of metal accumulation).

The aims of the present invention may require certain modifications or limitations of the above-described known methods for stimulating metal uptake. For example, since the present invention describes nutritional supplements that are to be eaten by human beings, it is important that the plants not contain toxic levels of the metals or of any other substances. For this reason, nontoxic organic acids are preferred inducing agents in the current invention. The Examples below disclose experimental results of metal uptake using citric acid as an inducing agent, but the use of other nontoxic organic acids, for example acetic acid, succinic acid, salicylic acid, or malic acid, is also contemplated within the scope of the invention.

The invention can be used to provide dietary supplements which supply any nutritionally valuable metal which can be induced to enter the edible portions of a plant in nutritionally significant quantities. The U.S. Recommended Dietary Allowances (RDA) for selected minerals, as determined by the U.S. Department of Agriculture for males age 25–50, as well as some literature recommended values for minerals not having RDAs are given in Table 1. While dietary supplements need not contain exactly these quantities of metals, these data provide guidelines on what constitute nutritionally significant quantities of various metals.

TABLE 1

| Mineral | USRDA or therapeutic dose† (mg) |
|---------|-------------------------------|
| Fe      | 10                            |
| Zn      | 15                            |
| Mn      | 2†                            |
| Cr      | 0.20†                         |
| Se      | 0.07–0.20†                    |

As mentioned above, the present invention encompasses the recognition that certain edible plants can accumulate metals in the edible portions. Without wishing to be bound by any particular theory, the present inventors propose that the accumulation process involves "demineralization" of the metals, so that their bioavailability is increased. For example, chromium is believed to move from roots to shoots of plants by binding to phytochelatins and organic acids. At least one organic acid, picolinic acid, has further been shown to increase the bioavailability of chromium in humans.

Further, some metals may provide increased benefits through a synergistic effect with other plant components. For example, it is believed that dietary selenium helps to protect against cancer. Recent studies have suggested that this effect may be intensified when selenium is taken with various antioxidants (see, for example, Salonen et al., "Risk of cancer in relation to serum concentrations of selenium and vitamins A and E," *British Medical Journal* 290:417–420, 1985). Many such antioxidants are already present in certain plants useful for the invention (e.g., Brassicaceae, in Fahey, et al., "Broccoli sprouts: an exceptionally rich source of inducers of enzymes that protect against chemical carcinogens," *Proc. Natl. Acad. Sci. USA* 94:10367–10372, 1997). Without making any claims of pharmaceutical efficacy, we note that one advantage of certain nutritional supplements of the present invention is that they are expected to have protective antioxidant effects. Similarly, iron uptake in humans can be enhanced by the presence of vitamin C (Davidsson, et al., "Iron bioavailability in infants: the influence of phytic acid and ascorbic acid in infant formulas based on soy isolate," *Ped. Res.* 36(6):816–822, 1994), and it may therefore be beneficial to use plants naturally rich in this vitamin for accumulating iron for the purpose of making dietary supplements. Similar synergistic effects may exist for other metals and other plant components.

In broad terms, the methods of the invention comprise the following steps: A growth environment containing desired metallic species is identified and/or created. An edible plant capable of accumulating the desired metals is then provided, and cultivated in the growth environment. While simply providing the enriched growth environment may be sufficient to yield accumulation of sufficient quantities of metal, it is often desirable to use an inducing agent to enhance the uptake of metal by the plant. While the exact mechanism by which such an agent enhances metal uptake need not be understood in order to practice the invention, it is often found that good inducing agents are mild to severe stressors of the plant. For example, plants may be induced to hyperaccumulate metal by very high metal concentrations in the soil, or by the addition of acids and/or chelators to the soil. In the Examples that follow, citric acid is used as an inducing agent.

The growth environment of the plant may be manipulated at various points during growth in order to control the amount of metal which is accumulated by the plant. For example, it may be desirable that the plant grow to a certain size before the addition of an inducing agent which causes hyperaccumulation of metals in the environment.

The most preferred embodiments of the invention employ hydroponic growth environments, because these environments are particularly easy to control. Desired metals and other additives can be added to such environments in precise amounts, at carefully controlled times, without also adding undesirable contaminants. Plants cultivated in outdoor fields may be subject to variation due to previous soil treatments, acid rain, or other factors. Nevertheless, the invention may be practiced using any soil environment which contains the desired metals in suitable quantities.

Many different plants can be used in the practice of the invention. It has been found that plants of the family Brassicaceae, particularly those of genera Brassica, Thlaspi, Alyssum, and Eruca, are capable of accumulating metal in their shoots and/or leaves. Particularly preferred are the species *Brassica juncea, Brassica nigra, Brassica campestris, Brassica carinata, Brassica napus,* and *Brassica oleracea*. The metal-accumulating properties of these plants may be further enhanced by the use of genetic manipulation. Such techniques are further described in U.S. patent application Ser. No. 08/252,234 (allowed), and include EMS mutagenesis and gene transfer from a variety of plant and animal species.

When cultivating *Brassica juncea* plants in a hydroponic or potting mix environment, one method of delivering metal and optional inducing agents is via an irrigation system. In one such system, the plants can be supplied with fertilizer, metal-containing solutions, and small amounts of an inducing agent such as citric acid for approximately four weeks, until the plants have attained a desirable size. At that time, an application of larger amounts of metal-containing solutions and the inducing agent can be used to cause the plants to hyperaccumulate large quantities of metal. The irrigation technique can also be used in conventional soil, which is seeded using available agricultural practices. It is desirable to select a sandy soil with low exchangeable aluminum, in order to minimize accumulation of this possibly harmful element in the edible portions of the plant.

Once the plant has accumulated one or more nutritionally valuable metals in its edible portions, these portions can be harvested using standard agricultural practices for food crops. These portions can then be eaten directly in order to obtain the nutritive metals, or they may be dried and incorporated into other forms such as capsules, tablets, powders, gels, or liquids, using techniques well-known to those skilled in the art. The edible plant portions may be formulated with other foods or liquids to provide premeasured supplemental foods, e.g., single-serving bars. Flavorings, binders, protein, complex carbohydrates, and the like may be added as needed. Further, pharmaceutical elements such as antibiotics may be incorporated into the supplements if desired.

In a preferred embodiment, the quantities of nutritionally valuable metals which have been accumulated in the plants are measured, and the plants are dried and mixed with dried plant material which has not been manipulated to accumulate metal. The resulting mixture can then be incorporated into capsules, tablets, or similar formulations by any method known in the art. By tailoring the ratio of enriched to unenriched plants in view of the level of accumulation of the enriched plants, the dosage of the mixture can be precisely controlled, an advantage of this method of formulating nutritional supplements. There have been reported cases of prior art supplements containing much greater quantities of some metals than reported on the label; see, for example, "Selenium poisoning from a nutritional supplement," *JAMA* 275:1087–88 (1996). "Natural" supplements are particularly vulnerable to this type of variability, since the plants from which they are generally made are subject to significant variability. The mixing method described above allows this safety hazard to be minimized or eliminated.

EXAMPLES

Example 1

Hydroponic Growth

The hydroponic system was created by germinating *B. juncea* seeds in rock wool blocks. The rock wool blocks were hydrated by placing them in a 10×23×2 inch tray containing water. Nutrients were added to the rock wool every five days by adding 100 ml of nutrient solution (2 g Hydrosol™ and 2.5 g CaNO$_3$, dissolved in 1 L of water) to each rock wool block (2 plants/block). After 3.5 weeks growth, 3 L of solution containing citric acid and one desired micronutrient was added to the tray containing the rock wool blocks. Fe, Mn and Zn were each added using the sulfate salts (FeSO$_4$ MnSO$_4$, and ZnSO$_4$) at concentrations of 0.5, 2.0, or 10 g/L of the metal. Cr and Se were each added as CrCl$_3$ and Na$_2$SeO$_4$ salts, respectively, each at 0.1 and 1.0 g Cr or Se/L. The citric acid was added at a concentration equimolar to the respective micronutrient. One week after the treatments were added the plants were harvested by cutting the stems 1 cm above the rock wool. The plant samples were placed in paper bags, dried at 60° C. and ground to 20 mesh. The dried and ground plant samples were wet ashed using a nitric/perchloric acid digestion and analyzed for metal content using inductively-coupled plasma optical emission spectroscopy (ICP). Results of this analysis are shown in Table 2. It will be seen that the addition of citric acid usually increased the level of metal uptake considerably, particularly when smaller amounts of metal were added to the growth environment. The plants grown according to this technique have high nutrient levels compared to conventionally grown plants. Their edible portions could be incorporated by techniques well-known in the art into capsule or tablet form, or could be eaten fresh or dried, in order to obtain metallic nutrients.

vested one week after the metal and citric acid additions. The plant tissue was dried, ground, and analyzed as previously described. Results of this analysis are shown in Table 4. It will be seen that the plants contained large quantities of the added nutrients as a result of the soil treatment. Their edible portions could be incorporated by techniques well-known in the art into capsule or tablet form, or could be eaten fresh or dried, in order to obtain these nutrients.

TABLE 2

| Metal Concentration | Citric Acid (equimolar to metal) | Fe | ±std err. | Mn | ±std err. | Zn | ±std err. | Cr | ±std err. | Se | ±std err. |
|---|---|---|---|---|---|---|---|---|---|---|---|
| | | (All values in mg/kg) | | | | | | | | | |
| 10 g/L | no | 27707 | 11419 | 8531 | 1437 | 41167 | 6553 | | | | |
| 10 g/L | yes | 15545 | 877 | 15782 | 2865 | 34657 | 1798 | | | | |
| 2 g/L | no | 950 | 225 | 3557 | 25 | 3854 | 1281 | | | | |
| 2 g/L | yes | 4293 | 240 | 7881 | 2711 | 20493 | 2844 | | | | |
| 0.5 g/L | no | 132 | 20 | 4090 | 1292 | 2529 | 1529 | | | | |
| 0.5 g/L | yes | 252 | 145 | 950 | 253 | 2626 | 838 | | | | |
| 1.0 g/L | no | | | | | | | 715 | 559 | | |
| 1.0 g/L | yes | | | | | | | 4700 | 856 | | |
| 0.1 g/L | no | | | | | | | 0 | | 754 | 124 |
| 0.1 g/L | yes | | | | | | | 0 | | 537 | 537 |

Example 2

Field Growth

*B. juncea* plants were broadcast seeded in the field at the rate of 12 lbs. seed/acre. The plots were fertilized with 300, 150 and 150 lbs/acre N, P, and K, respectively. In addition the plots received weekly fertilization additions of Blu-Gro™ at the rate of 1 ml/ft$^2$ applied through the overhead sprinkler irrigation system. After 4 weeks growth (at the onset of flowering), citric acid was applied to the plot through the sprinkler system at the rate of 2.5 mmol citric acid/kg soil (500 mmol/m$^2$). One week after treatment the plants were harvested by cutting the stem at the soil surface. The plant tissue was dried at 60° C., ground and analyzed as previously described. Results of this analysis are shown in Table 3. It will be seen that the dried plants contained high levels of the nutrients potassium and calcium as a result of the manipulation of their growth environment. The edible portions of the plants could be incorporated by techniques well-known in the art into capsule or tablet form, or could be eaten fresh or dried, in order to obtain these nutrients.

TABLE 3

| | Ca | Cu | Fe | K | Mg | Mn | S | Zn |
|---|---|---|---|---|---|---|---|---|
| | (all values in mg/kg) | | | | | | | |
| Shoot concentration | 20,467 | 19 | 584 | 42,437 | 3,691 | 225 | 8,034 | 778 |

Example 3

Potting Mix

*B. juncea* seeds were planted in 3.5" diameter pots containing Pro-Mix (commercial potting mix). The plants were thinned to 2 plants/pot 3 days after seedling emergence. After 4 weeks growth three pots were placed into a 10"×23"×2" plastic tray with 3 L of water containing Cr, Fe, or Zn at 5 g/L. Citric acid was added to the trays in equimolar concentrations to the applied metal. The plants were har-

TABLE 4

| Treatment | Cr | Fe | Zn |
|---|---|---|---|
| | (All values in mg/kg) | | |
| Cr (5 g/L) | 50,900 | 357 | 300 |
| Fe (5 g/L) | ND | 29,900 | 187 |
| Zn (5 g/L) | ND | 663 | 53,800 |
| Fe (5 g/L) + Zn (5 g/L) + Cr (5 g/L) | 9610 | 8560 | 11,800 |

Example 4

Increased Bioavailability of Metals

*B. juncea* plants were grown in 3.5" diameter pots containing Pro-Mix (commercial potting mix). The plants were thinned to 2 plants per pot 3 days after emergence. After four weeks growth, metals were applied in two modes. For those plants having metals applied to the pan, three pots were placed into a 10"×23"×2" plastic tray with 3 L of water containing Cr, Fe, or Zn at 5 g/L. For those plants having metals applied to the pot, 20 mL of 0.5M of each of metal was applied to the soil surface in each pot. Citric acid was added to the trays or pots in equimolar concentrations to the applied metal. The plants were harvested one week after the metal and citric acid additions. The plant tissue was dried and ground. Duplicate samples of each metal/plant combination was then extracted sequentially using the procedure of Tessier, et al., "Sequential Extraction Procedure for the Speciation of Particulate Trace Metals," *Analyt. Chem.* 51(7):844–851, 1979 (incorporated herein by reference) to assess the degree of bioavailability as described by Berti et al., "Sequential chemical extraction of trace elements: Development and use in remediating contaminated soils," *Proc. 3rd Int'l Conf. Biogeochem. of Trace Elements*, Paris, May 1995 (incorporated herein by reference). The sequential extraction procedure uses five extractants that are operationally defined to selectively extract a certain fraction of the metal, removing the more bioavailable forms first and less bioavailable forms with each subsequent extraction. The fractions extracted and the extractant used are the following: (1) exchangeable—metals that are readily extracted with 1M MgCl$_2$ (2) carbonate—metals that are readily extracted with 1N NaOAc at pH 5, (3) oxide—metals that are readily extracted with 0.04M hydroxylamine hydrochloride at pH 0, (4) organic—metals that are readily extracted with 30% hydrogen peroxide and 0.1N HNO$_3$, (5) residual—metals that are readily extracted with concentrated nitric acid.

For comparison, duplicate samples of four over-the-counter mineral supplements (Centrum multivitamin, Zn picolinate, GNC G.T.F. Chromium, and Cr picolinate) were similarly extracted to assess their degree of bioavailability. Results are shown in FIGS. 1–3.

FIG. 1 presents bioavailability data for chromium. Data for commercially available vitamin supplements are represented by circles for Centrum multivitamins, squares for GNC G.T.F. Chromium, and triangles for Cr picolinate. x's represent data for plants that had chromium applied to the pan holding the pots, and stars represent data for plants that had iron, zinc, and chromium applied directly to the pot.

Figure 2:
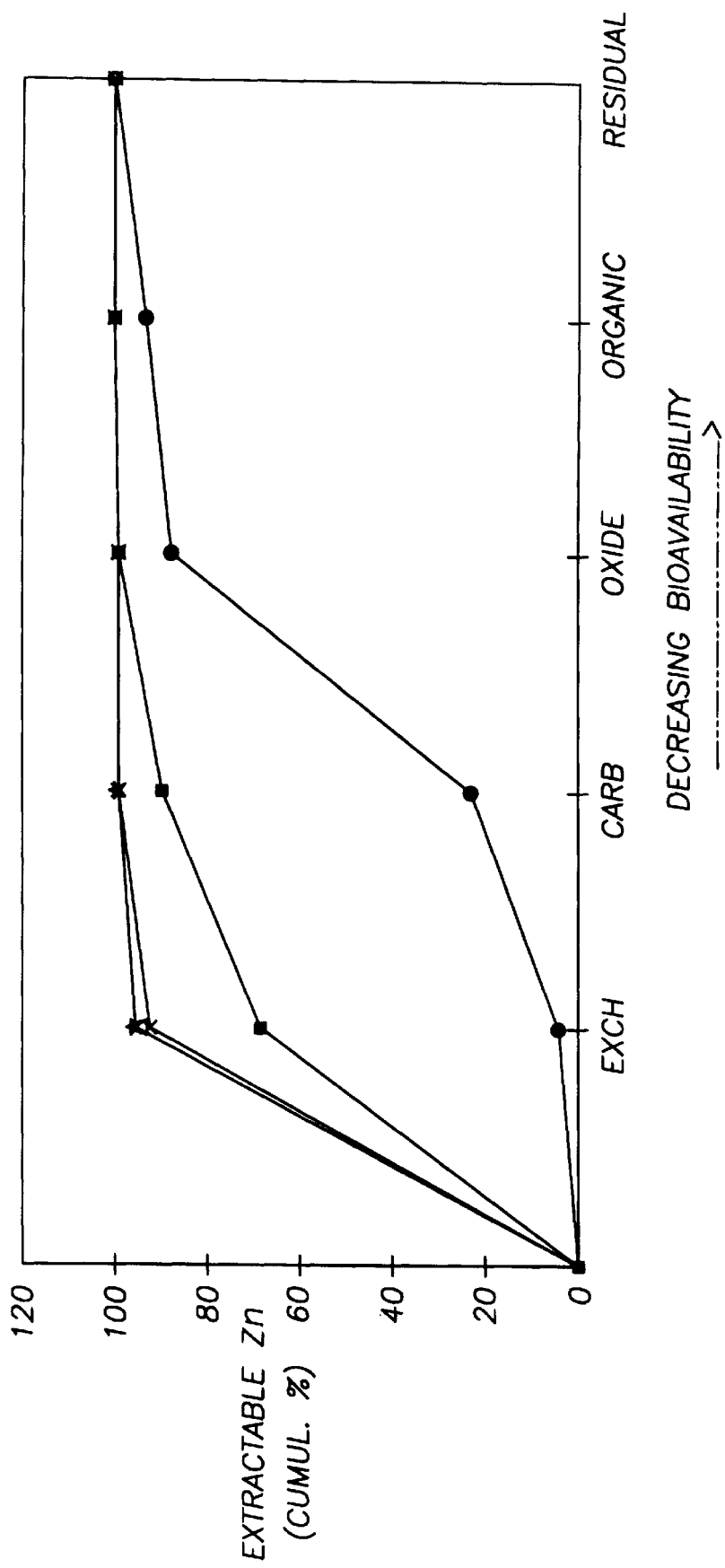
FIG. 2 depicts the bioavailability of zinc in plants according to the invention and in commercially available nutritional supplements.

FIG. 2 presents bioavailability data for zinc. Data for commercially available vitamin supplements are represented by circles for Centrum multivitamins, and squares for Zn picolinate. Triangles represent data for plants that had zinc applied to the pan holding the pots, x's represent data for plants that had zinc applied directly to the pot, and stars represent data for plants that had iron, zinc, and chromium applied directly to the pot.

Figure 3:
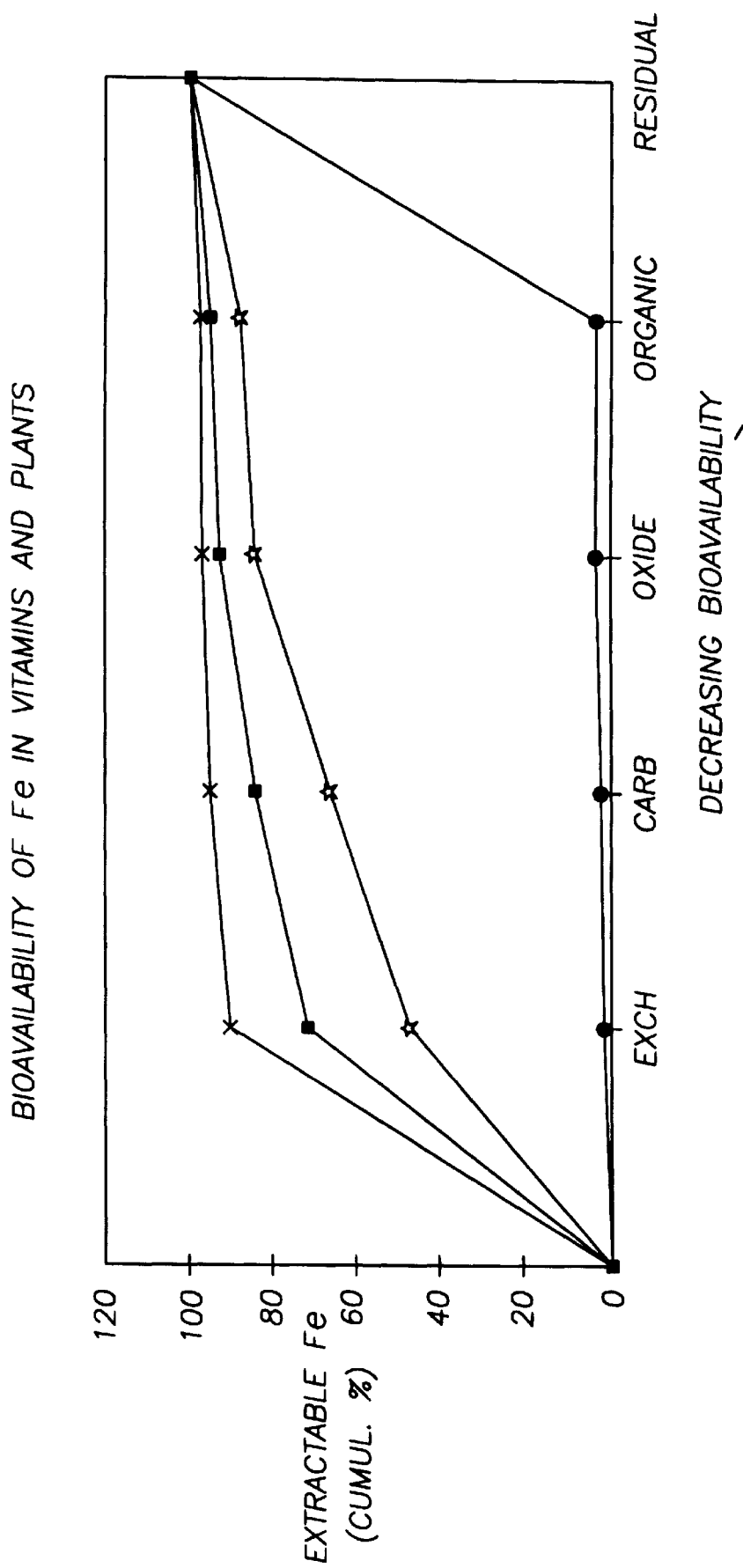
FIG. 3 depicts the bioavailability of iron in plants according to the invention and in commercially available nutritional supplements.

FIG. 3 presents bioavailability data for iron. Data are represented by circles for commercially available Centrum multivitamins. Squares represent data for plants that had iron applied to the pan holding the pots, x's represent data for plants that had iron applied directly to the pot, and stars represent data for plants that had iron, zinc, and chromium applied directly to the pot.

It will be seen that each of the three metals accumulated in the plant supplements is more bioavailable than several leading mineral supplements.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A nutritional supplement comprising the edible portions of a plant which has been induced by exposure to an inducing agent during cultivation to hyperaccumulate metals in its edible portions, and which has been incorporated into any of a processed food, a capsule, a tablet, a powder, a gel, and a liquid.

2. The nutritional supplement of claim 1, whereby the plant is characterized by at least 400 parts per million dry weight of nutritionally valuable metal in at least some of its edible portions.

3. The nutritional supplement of claim 1, whereby the plant has been induced to hyperaccumulate metals by exposing it to an inducing agent.

4. The nutritional supplement of claim 3, whereby the inducing agent is an organic acid.

5. The nutritional supplement of claim 4, whereby the inducing agent is selected from the group consisting of citric acid, acetic acid, malic acid, salicylic acid and succinic acid.

6. The nutritional supplement of claim 1, whereby the plant is a member of the family Brassicaceae.

7. The nutritional supplement of claim 6, whereby the plant is of a species selected from the group consisting of *Brassica juncea, Brassica oleracea*, and *Brassica carinata*.

8. An isolated, edible plant which is characterized by a hyperaccumulation of at least 400 parts per million dry weight of nutritionally valuable metal in at least some of its edible portions.

9. The plant of claim 8, whereby the plant is a member of the family Brassicaceae.

10. The plant of claim 9, whereby the plant is of a species selected from the group consisting of *Brassica juncea, Brassica oleracea*, and *Brassica carinata*.

11. A method of producing nutritional supplements, comprising:

identifying a growth environment containing one or more metals;

contacting at least one edible crop plant with the growth environment;

cultivating the plant in the growth environment with an inducing agent, under conditions and for a time sufficient for the plant to hyperaccumulate a nutritionally significant amount of at least one metal in at least some of its edible portions;

harvesting at least some edible porions of the plant which have hyperaccumulated metal; and using the harvested portions of the plant to produce a nutritional supplement in a form selected from the group consisting of a processed food, a capsule, a tablet, a powder, a gel, and a liquid.

12. The method of claim 11, where the growth environment contains at least one of the group consisting of iron, zinc, manganese, chromium, selenium, vanadium, molybdenum, boron, titanium, and germanium.

13. The method of claim 11, where identifying the growth environment includes manipulating the growth environment to increase availability of metals to the plant.

14. The method of claim 13, where manipulating the growth environment includes adding at least one metal to the growth environment.

15. The method of claim 14, where the added metal comprises at least one of the group consisting of iron, zinc, manganese, chromium, and selenium.

16. The method of claim 11, whereby the plant is a member of the family Brassicaceae.

17. The method of claim 16, whereby the plant is of a species selected from the group consisting *Brassica juncea, Brassica oleracea*, and *Brassica carinata*.

18. The method of claim 11, whereby cultivating the plant comprises exposing the plant to an inducing agent under conditions and for a time sufficient for the inducing agent to induce the plant to hyperaccumulate metal in its edible portions.

19. The method of claim 18, where the inducing agent is an organic acid.

20. The method of claim 19, where the organic acid is selected from the group consisting of citric acid, acetic acid, malic acid, salicylic acid and succinic acid.

21. The method of claim 11, where the harvested plant comprises nutritionally significant quantities of at least two metals.

* * * * *

UNITED STATES PATENT AND TRADEMARK OFFICE
CERTIFICATE OF CORRECTION

PATENT NO : 6,117,462
DATED : Sep. 12, 2000
INVENTOR(S) : Ensley et al.

It is certified that error appears in the above-identified patent and that said Letters Patent are hereby corrected as shown below:

On the title page, please correct item "[75] Inventors:" as follows:

Please insert --; Ilya Raskin, Manaplan, N.J; Joseph O'Neal, Highland Park, NJ.-- after "Jianwei Huang, Plainsboro, N.J."

Signed and Sealed this

Twenty-ninth Day of May, 2001

*Attest:*

NICHOLAS P. GODICI

*Attesting Officer*     *Acting Director of the United States Patent and Trademark Office*